United States Patent
Steinke (10) Patent No.: US 11,221,964 B2
(45) Date of Patent: Jan. 11, 2022

(54) ALLOCATING ADJACENT FILE PARTS TO DIFFERENT VIRTUAL CYLINDER GROUPS MAPPED TO PHYSICAL STORAGE DEVICES

(71) Applicant: EMC IP Holding Company LLC, Hopkinton, MA (US)

(72) Inventor: Ronald Steinke, Tacoma, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/393,188

(22) Filed: Apr. 24, 2019

(65) Prior Publication Data

US 2020/0341906 A1 Oct. 29, 2020

(51) Int. Cl.
*G06F 3/06* (2006.01)
*G06F 12/109* (2016.01)

(52) U.S. Cl.
CPC ...... *G06F 12/109* (2013.01); *G06F 2212/262* (2013.01); *G06F 2212/657* (2013.01)

(58) Field of Classification Search
CPC ............. G06F 12/109; G06F 2212/262; G06F 2212/657
See application file for complete search history.

(56) References Cited

U.S. PATENT DOCUMENTS

| | | | | |
|---|---|---|---|---|
| 5,742,792 A | * | 4/1998 | Yanai | G06F 3/0601 711/162 |
| 6,557,123 B1 | * | 4/2003 | Wiencko, Jr. | G06F 11/1076 711/114 |
| 6,763,439 B1 | * | 7/2004 | Bakin | G06F 3/0613 348/E5.007 |
| 10,140,041 B1 | * | 11/2018 | Dong | G06F 3/0619 |
| 2002/0120763 A1 | * | 8/2002 | Miloushev | H04L 67/1023 709/230 |
| 2010/0169573 A1 | * | 7/2010 | Tsuji | G06F 3/0613 711/114 |
| 2015/0146611 A1 | * | 5/2015 | Joshi | H04L 41/5029 370/328 |
| 2018/0276263 A1 | * | 9/2018 | Voigt | G06F 9/4881 |

OTHER PUBLICATIONS

Patterson. et al., A Case for Redundant Arrays of Inexpensive Disks (RAID), Dec. 1987 (Year: 1987).*

* cited by examiner

*Primary Examiner* — Larry T Mackall
(74) *Attorney, Agent, or Firm* — Amin, Turocy & Watson, LLP (57) ABSTRACT

The described technology is generally directed towards allocating adjacent file parts to different virtual cylinder groups mapped to storage devices in a storage array system. According to an embodiment, a system can comprise a processor and computer executable components that can comprise a file allocating component that can allocate a first part of a file to a first logical data block mapped to a first physical data block on a first storage device, and allocate a second part of the file to a second logical data block mapped to a second physical data block on a second storage device, the allocating being based on the second physical data block being on a different storage device than the first physical data block. The components can also comprise a storage device controller that can write the first and second parts of the file to the first and second physical data blocks.

20 Claims, 10 Drawing Sheets

ALLOCATING ADJACENT FILE PARTS TO DIFFERENT VIRTUAL CYLINDER GROUPS MAPPED TO PHYSICAL STORAGE DEVICES

TECHNICAL FIELD

The subject application generally relates to protected storage of data, and, for example, to improving the efficiency of storing and retrieving protected stores of data, and related embodiments.

BACKGROUND

As the importance, amount, and complexity of information stored for use by computer systems continues to grow, the need for real-time protected data storage grows as well. To improve speed, efficiency, and protection, conventional protected storage systems can rely on complex reads, writes, and recovery of information across multiple storage devices. However, in many cases, not only does data need to be protected, it also needs to be retrieved quickly, e.g., stored files that are output by streaming.

In some circumstances, the measures used in protected data storage can also reduce the performance of file retrieval. In addition, although using more hardware to increase performance can be effective in some circumstances, in many instances, the extra hardware used in protected storage systems are not used to improve performance.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

According to an embodiment, a system can comprise a node in a redundant array of independent storage devices, the node comprising a memory that stores computer executable components, a first storage device and a second storage device, and a processor that can execute the computer executable components stored in the memory. The computer executable components can comprise a file allocating component that can allocate a first part of a file to a first logical data block, the first logical data block being mapped to a first physical data block on the first storage device, and can allocate a second part of the file to a second logical data block, the second logical data block being mapped to a second physical data block on the second storage device, the allocating being based on the second physical data block being on a different storage device than the first physical data block. The components can also comprise a storage device controller that can write the first part and the second part of the file to the first physical data block and the second physical data block.

According to another embodiment, a computer-implemented method can comprise communicating, by a streaming device comprising a processor, a request for a file to a storage array device, wherein the file is stored, in parts, on two or more storage devices of the storage array device, wherein adjacent parts of the parts of the file are allocated by the storage array device to different storage device groups. The computer implemented method can further comprise receiving, by the streaming device, from the storage array device based on the request, a first part and a second part of the file, wherein the first part is received from a first storage device in a first storage device group of the different storage device groups and the second part is received from a second storage device in a second storage device group of the different storage device groups.

According to another embodiment, a computer program product is provided. The computer program product can comprise a machine-readable storage medium comprising executable instructions that, when executed by a processor, facilitate performance of operations comprising allocating a first part of a file to a first logical data block, the first logical data block being mapped to a first physical data block on a first storage device. The operations can also comprise allocating a second part of the file to a second logical data block, the second logical data block being mapped to a second physical data block on a second storage device, the allocating being based on the second physical data block being on a different storage device than the first physical data block. Further, the operations can comprise writing the first and second parts of the file to the first and second physical data blocks.

Other embodiments may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements, and in which.

DETAILED DESCRIPTION

Various aspects described herein are generally directed towards maintaining a consistent logical data size with variable protection stripe size in an array of independent disks. As will be understood, the implementation(s) described herein are non-limiting examples, and variations to the technology can be implemented.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

As described in examples below, one or more embodiments described herein can implement a system with a parity protected array of independent disks, with two or more of independent disks in one or more computer systems linked to form the array. It should be noted that, while many of the embodiments described herein can share one or more features with a conventional redundant array of inexpensive (or independent) disks (RAID) implementation, alternative and additional combinations of features are described herein that can implement a clearly different protected storage system. For example, one or more embodiments can form an array of hard disks across multiple computer systems, e.g., as depicted with the description of FIG. 2 below. It should further be noted that, although one or more embodiments describe different approaches, one or more features described herein can also be applied to a conventional RAID implementation, e.g., RAID generally employing multiple disk drives operated by one node. Further details of one or more embodiments are described below.

The computer processing systems, computer-implemented methods, apparatus and/or computer program products described herein employ hardware and/or software to solve problems that are highly technical in nature (e.g., logical addresses for physical storage of parity protected data), that are not abstract and cannot be performed as a set of mental acts by a human. For example, a human, or even a plurality of humans, cannot efficiently, accurately and effectively, facilitate the grouping of storage devices and the parallel retrieval of data from the storage device groups, with the same level of accuracy and/or efficiency as the various embodiments described herein.

Figure 1:
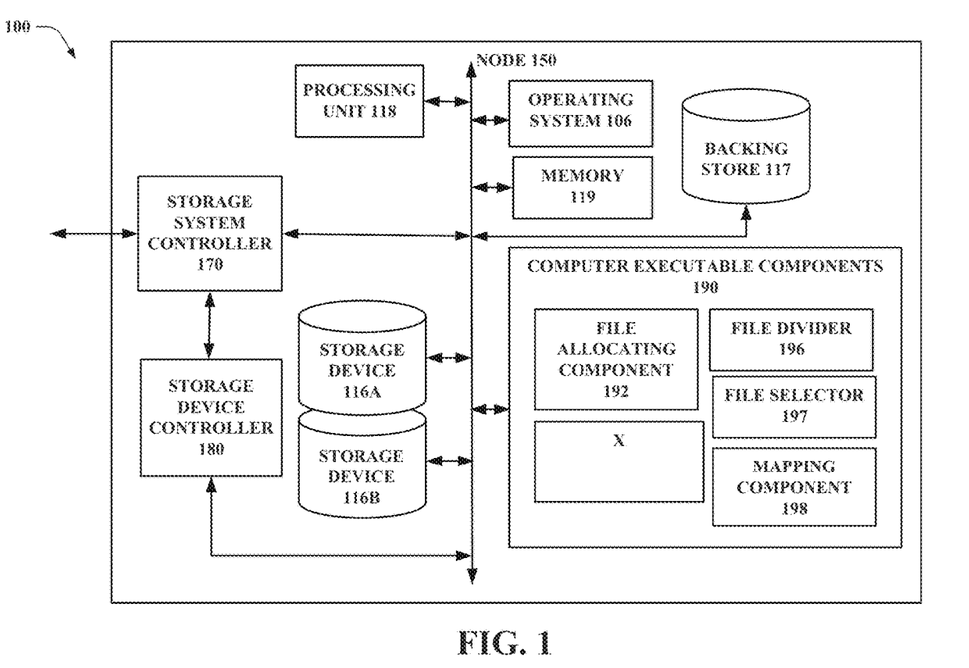
FIG. 1 illustrates a block diagram of an example, non-limiting system that can facilitate allocating adjacent file parts to different virtual cylinder groups mapped to storage devices, in accordance with various aspects and implementations of the subject disclosure.

FIG. 1 illustrates a block diagram of an example, non-limiting system that can facilitate allocating adjacent file parts to different virtual cylinder groups mapped to storage devices, in accordance with various aspects and implementations of the subject disclosure. Node 150 as depicted includes operating system 106, such as a Linux®-based operating system, which can manage computer executable components 190, storage device controller 180, and storage system controller 170.

Storage system controller 170 can manage the use of storage devices 116A-B as a part of the protected storage array described above. In one or more embodiments, node 150 with storage devices 116A-B can be linked with one or more additional nodes similar to node 150, to implement the protected storage array. As discussed further with FIG. 2 below, in one or more embodiments, one or more of the additional nodes linked to node 150 can also have a storage system controller 170, and one or more of these storage system controllers 170 can implement and manage the entire protected storage array, either independently or dividing tasks among multiple nodes 150. Further, storage system controller 170 can be operated by one or more of computer executable components 190, e.g., file allocating component 192, file divider 196, file selector 197, and mapping component 198. In one or more embodiments, computer executable components 190 can include some components of the OneFS® distributed file system provided by DELL EMC, Inc, as well as other components.

According to one or more embodiments, processing unit 118 can comprise one or more types of processors and/or electronic circuitry that can implement one or more computer and/or machine readable, writable, and/or executable components and/or instructions that can be stored in memory 119. For example, processing unit 118 can perform various operations that can be specified by such computer and/or machine readable, writable, and/or executable components and/or instructions including, but not limited to, logic, control, input/output (I/O), arithmetic, and/or the like. In some embodiments, processing unit 118 can comprise one or more central processing unit, multi-core processor, microprocessor, dual microprocessors, microcontroller, System on a Chip (SOC), array processor, vector processor, and/or another type of processor. Further examples of processing unit 118 are described below with reference to processing unit 1014 and FIG. 10. Such examples of processing unit 118 can be employed to implement any embodiments of the subject disclosure.

One or more embodiments described herein can use logical backing store 117 to map logical data blocks (LDBs) (e.g., logical addresses) onto physical storage addresses, e.g., in storage devices 116A-B, and storage devices in other nodes. System 100 can include logical backing store 117 that can, in one or more embodiments, improve many aspects of the operation of systems described herein, including, but not limited to, locating a down drive or node can be performed faster, repairing degraded stores to full protection can be accomplished based on the logical backing store data, without the need for data about individual files, in some circumstances, blocks that need to be repaired due to drive or node loss are stored in large, contiguous regions of the physical storage, thus allowing more efficient streaming of reads and writes, and the rapid use of a cached logical backing store to perform operations. One or more implementations and additional details of logical backing store 117 are described with FIG. 3 below.

Figure 2:
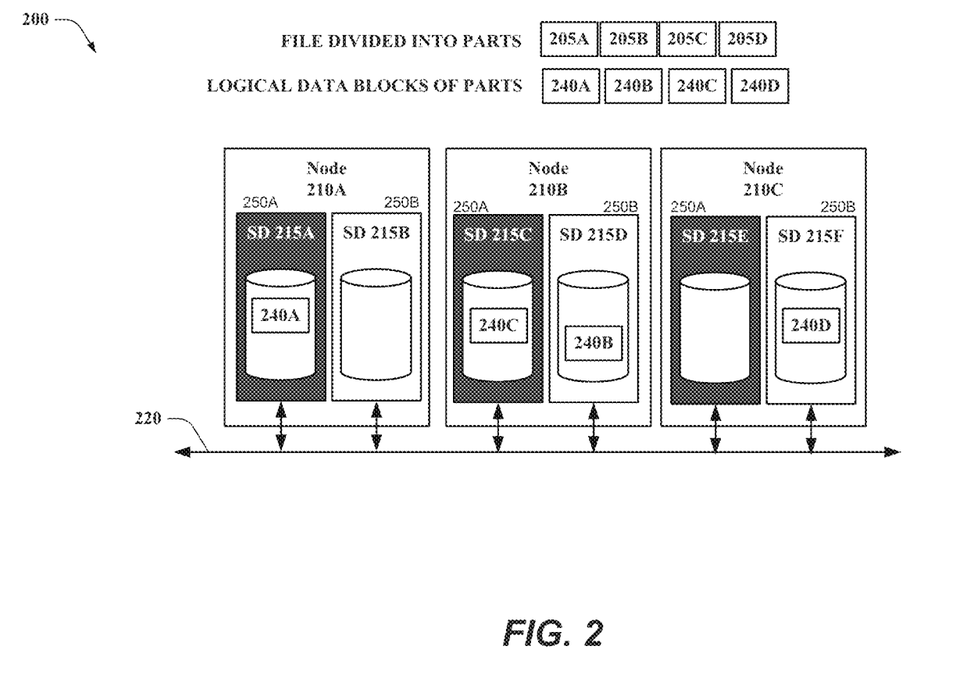
FIG. 2 illustrates an example, non-limiting system having an array of independent storage devices with three nodes and two storage devices per node, divided between two storage device groups, in accordance with one or more embodiments.

FIG. 2 illustrates an example, non-limiting system 200 having an array of independent storage devices with three nodes 210A-C and two storage devices 215A-F per node, divided between two storage device groups 250A-B, in accordance with one or more embodiments. For purposes of brevity, description of like elements and/or processes employed in other embodiments is omitted.

System 200 provides an example of how one or more embodiments can divide storage devices between two or more storage device groups. It is important to note that, although many of the examples discussed herein employ two storage device groups 250A-B, other numbers of groups greater than two are possible, in keeping with the disclosures herein. Storage devices in groups can be used, by one or more embodiments, for ends including, but not limited to, improving the speed of retrieval of files stored by system 200, e.g., useful for processes that include output that serves streaming multimedia. An example of As depicted, nodes 210A-C are interconnected by a connection 220, e.g., a network connection. In an example implementation, data can be stored by store operation in one node (e.g., node 210A) and retrieved by retrieve operation from another node (e.g., node 210B) of the system. In one or more embodiments, system 200, and other embodiments described herein, can be facilitated by peer management processes installed on one or more nodes 210A-C or can be managed by one or more management processes operating on other devices, e.g., storage system controller 170 discussed with FIG. 1 above.

As discussed further with the description of FIGS. 2-3 below, one or more embodiments can receive a file for storage and determine (e.g., by file selector 197) whether to divide parts of the file between the two storage device groups 250A-B as described herein, or store the files in accordance with other storage protocols. A flow diagram describing the selection process is described further with FIG. 4 below.

After selection, in one or more embodiments, the received file can be divided into parts 205A-D for storage, e.g., by file divider 196. As discussed below, the size of parts 205A-D can be based on the selection by file selector 197. Once divided, in one or more embodiments, the parts 205A-D of the file can be allocated to LDBs 240A-D. As described with FIG. 1 above, LDBs can be mapped to physical storage locations in storage devices, e.g., SDs 215A-F.

In one or more embodiments, upon allocation LDBs are selected that alternate between the two storage device groups 250A-B. For example, as depicted in FIG. 2, LDB 240A is allocated to SD 215A in storage device group 250A. The next file part 240B is allocated to SD 215D in storage device group 250B. In accordance with the embodiments described above, file parts 210C and 210D are stored on SDs from storage device groups 250A-B respectively. A more detailed diagram of how storage device groups 250A-B relate to protection stripes, parity bits, and virtual cylinder groups is included with FIG. 5 below.

Figure 3:
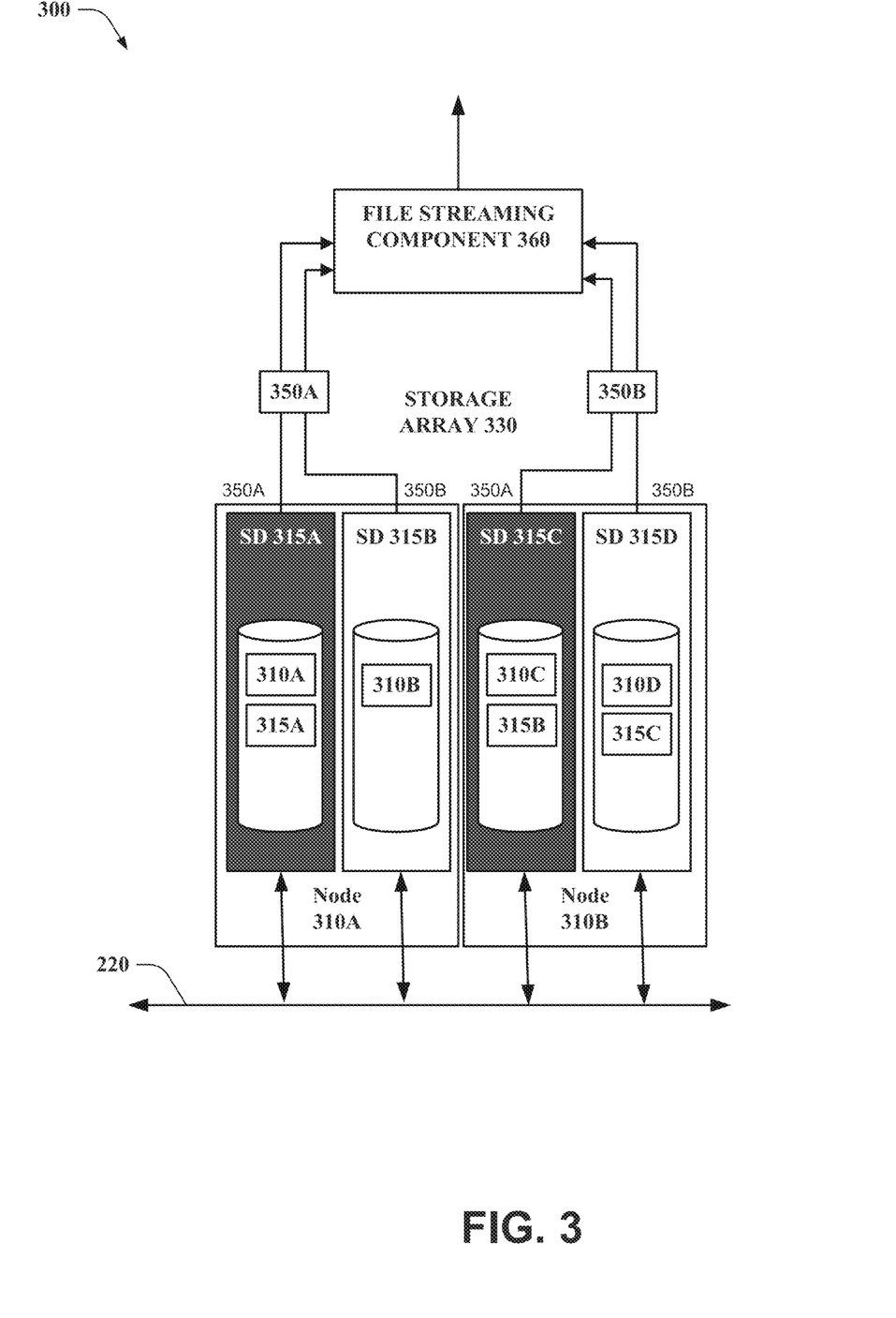
FIG. 3 depicts an non-limiting example system that can facilitate retrieving files using logical data block addresses from a storage array having two nodes with four storage devices, each being in one of two storage device groups.

FIG. 3 depicts an non-limiting example system 300 that can facilitate retrieving files using LDB addresses from a storage array 330 having two nodes 310A-B with four storage devices 315A-D, each being in one of two storage device groups 350A-B, in accordance with one or more embodiments. For purposes of brevity, description of like elements and/or processes employed in other embodiments is omitted.

As depicted in FIG. 3, two files have been divided into parts and stored in two or more of storage devices 315A-D. In the example, file 310A-D is a file stored for streaming as described above, and files 315A-C is a file that is not stored on alternating storage device groups, e.g., because this file is a file that is used for random access retrieval, and thus generally does not require the approaches described herein. Specifically, considering the storage of streaming file 310A-D, parts 310A-D alternate between storage device groups 350A-B by spanning SDs 315A-D. File 315A-C was not stored using this alternating storage device group, because both parts 315A and 315B are in storage device group 350A.

As depicted, system 300 also includes file streaming component 360, with connections to each SD 315A-D. In one or more embodiments, this component can generate a stream that can output file 310A-D in order, beginning (e.g., 350A) with the LDB for file 310A which maps to a physical address of a location in SD 315A. In one or more embodiments, because adjacent file parts 310A-D are specified as being stored on separate physical devices, parallel retrieval of both 310A-B can occur. After the retrieval of both parts 315A-B, part 315A can be streamed and part 315B can be cached, while parts 315C-D are retrieved from node 310B in parallel in a similar way.

Figure 4:
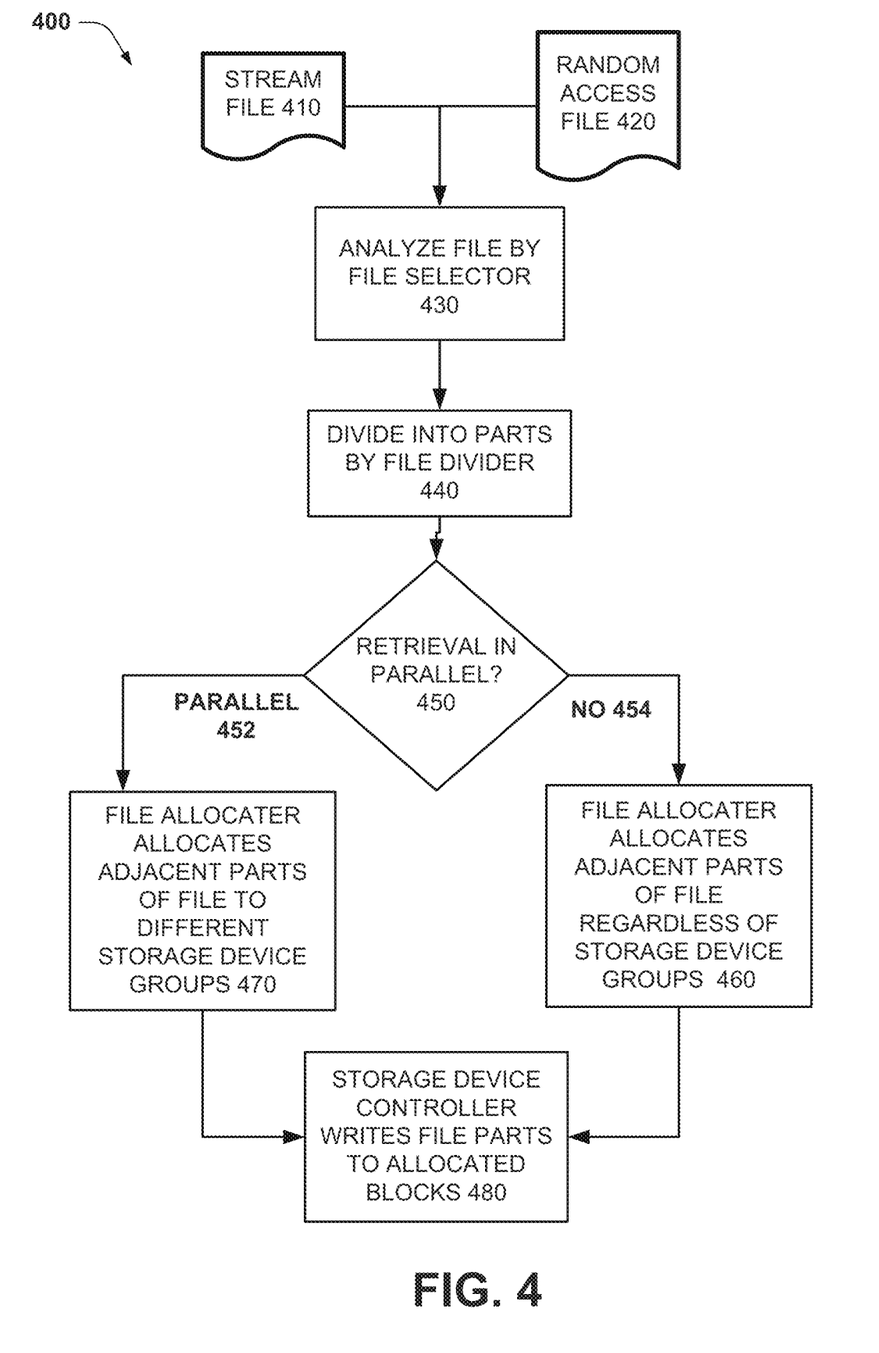
FIG. 4 depicts an example flow diagram of file intake process that can be used by one or more embodiments.

FIG. 4 depicts an example flow diagram of file intake process that can be used by one or more embodiments. In this example, stream file 410 and random access file 420 are to be stored in storage array 330. For purposes of brevity, description of like elements and/or processes employed in other embodiments is omitted.

At block 430, the files are analyzed by file selector 197 to determine whether one or both of these files are to be stored across storage device groups, e.g., to increase read performance as described above. This analysis can be simple, such as reading a toggle on or off bit, or can be more complex, such as analyzing the content to detect high-speed retrieval requirements.

At block 440, both files can be divided into parts by file selector, with the sizes of each part being based, in one or more embodiments, on the analysis performed by the file selector, e.g., manual breaks can be added to the file, to indicate a good place to divide the files into parts. At decision block 450 if, file selector 430 determines that the file is to be stored across storage device groups (e.g., to facilitate the retrieval in parallel discussed with FIG. 4 above), at block 470, file allocating component 192 can select for allocation, available LDBs that correspond to physical locations on SDs that alternate between storage device groups 350A-B, e.g., like file parts 310A-D. When file selector determines that a file (e.g., file 315A-C) does not require additional processing, the file can be allocated LDBs without determining without allocating the file to alternating storage device groups. At block 480, storage device controller 180 can write the allocated file parts to physical locations to which they have been allocated.

Figure 5:
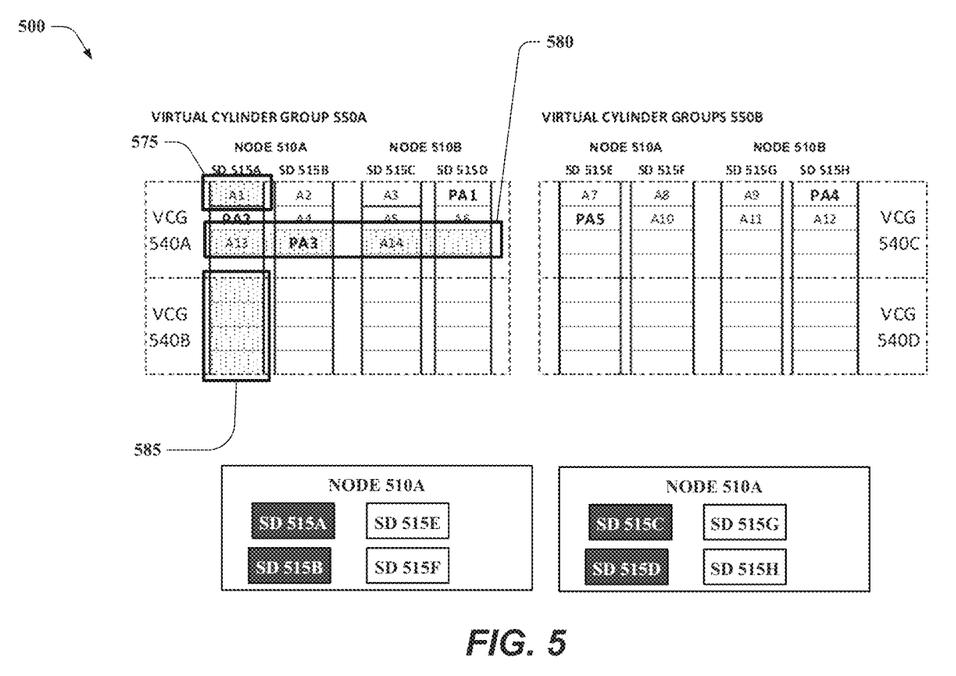
FIG. 5 depicts a data structure for a storage array 500 with file parts being stored on SDs grouped by storage device groups black 550A and white 550B, in accordance with one or more embodiments.

FIG. 5 depicts a data structure for a storage array 500 with file parts being stored on SDs grouped by storage device groups 550A-B, in accordance with one or more embodiments. For purposes of brevity, description of like elements and/or processes employed in other embodiments is omitted.

In contrast to FIG. 2, where SDs 215A-F in storage device groups 250A-B were shown organized by nodes 210A-C, FIG. 5 organizes SDs 515A-H by storage device groups 550A-B. For illustration, FIG. 5 also includes another view of SDs 515A-D and 515E-H grouped by nodes 510A-B respectively.

Each storage device is depicted divided into eight LDBs 575 of data, these being mapped to physical storage addresses in respective nodes. The eight LDBs 575 of data are divided into two virtual cylinder groups (VCGs) 540A-B and 540C-D of four LDBs 575 each for each of storage device groups 550A-B. As would be appreciated by one having skill in the relevant arts, given the description herein, these subsets of data can facilitate the use of parity protection to protect data stored within the VCGs.

Protection stripe 580 can be protected by parity bits PA3, e.g., as data is written across the stripe, parity bits can be stored in LDBs in the stripe. For example, in FIG. 5, the first stripe can store parts of file A across SDs 515A-C, with parity bits for file A (e.g., PA1) being stored on node 515D. In this example, each VCG 540A-D can include a protection stripe 580 for each of the LDBs per node of a VCG, e.g., four stripes per VCG.

It is important to note that, in one or more embodiments, although, as depicted in FIG. 5, protection stripes horizontally cross nodes 510A-B and SDs 515A-D in storage device group 550A, protection stripe 580 does not include LDBs from white storage device group 550B. Similarly, in one or more embodiments, VCGs 540A-D only brloThis separation emphasizes the independence of these storage device groups 550A-B, these groups only depending on the other group in limited circumstances, e.g., when adjacent parts of a file (e.g., A1-6 and A13-14 in storage device group 550A, and A7-A12 in storage device group 550B) are rejoined during streaming of the file.

In addition, the structure of this example includes a metacluster 585 of LDBs for each SD, e.g., SD 515A. As depicted, VCGs can comprise metaclusters 585 for each node in the VCG, e.g., virtual cylinder groups 540A-C each include four metaclusters. In one or more embodiments, within a metacluster, the block layout can follow the pattern used for laying out the entire VCG. In some circumstances, this can preserve a design balance between contiguous I/O operations and rotating the load between storage devices. Further, in one or more embodiments, the logical to physical mapping of LDBs within a VCG can remain unchanged as long as the VCG is stored at the same protection level.

With respect to the allocation of parts of files divided (e.g., by file divider 196), in this example, each part of file A1-14 is the size of six LDBs 575. It should be noted that, even for the same size of file part, the number LDBs per file can change for different systems based on the physical size of the SD mapped by each LDB. This can change based on system configuration. In addition, in one or more embodiments, even given the same size of LDB, tuning the balance between performance and efficiency can change the number of LDBs per file part. For example, the first part of the file is stored as A1-A6 in storage device group 550A. Upon streaming of this portion of the file (e.g., described with FIG. 4 above), four SDs 515A-515D can be simultaneously working to retrieve either one LDB (e.g., SDs 515A and 515D) or two LDBs (e.g., SDs 515B and 515C). If the size of the file part was reduced from six to three for this example (e.g., A1-A3), then only three storage devices would have to work on retrieving one LDB 575 each. In one or more embodiments, this number of LDBs per file part can be different for different files and parts of files, depending upon system tuning.

Once the first part of the file has been stored in logical device block 550A, the second part of the file (e.g., six LDBs A7-12) can be stored on two protection stripes of VCG 540C in storage device group 550B. The third part of the file (e.g., A13-14) does not take up the full six LDBs back in storage device group 550A. As noted above most of the examples described herein use two storage device groups, but this is not limiting. In an alternative embodiment with three storage device groups 550A-C (not shown), this third part of the file would be stored in a stripe across two of SDs 515I-L. In this variation, performance could be increased by having all three parts of the file retrieved in parallel by a combination of ten SDs 515A-515J.

Figure 6:
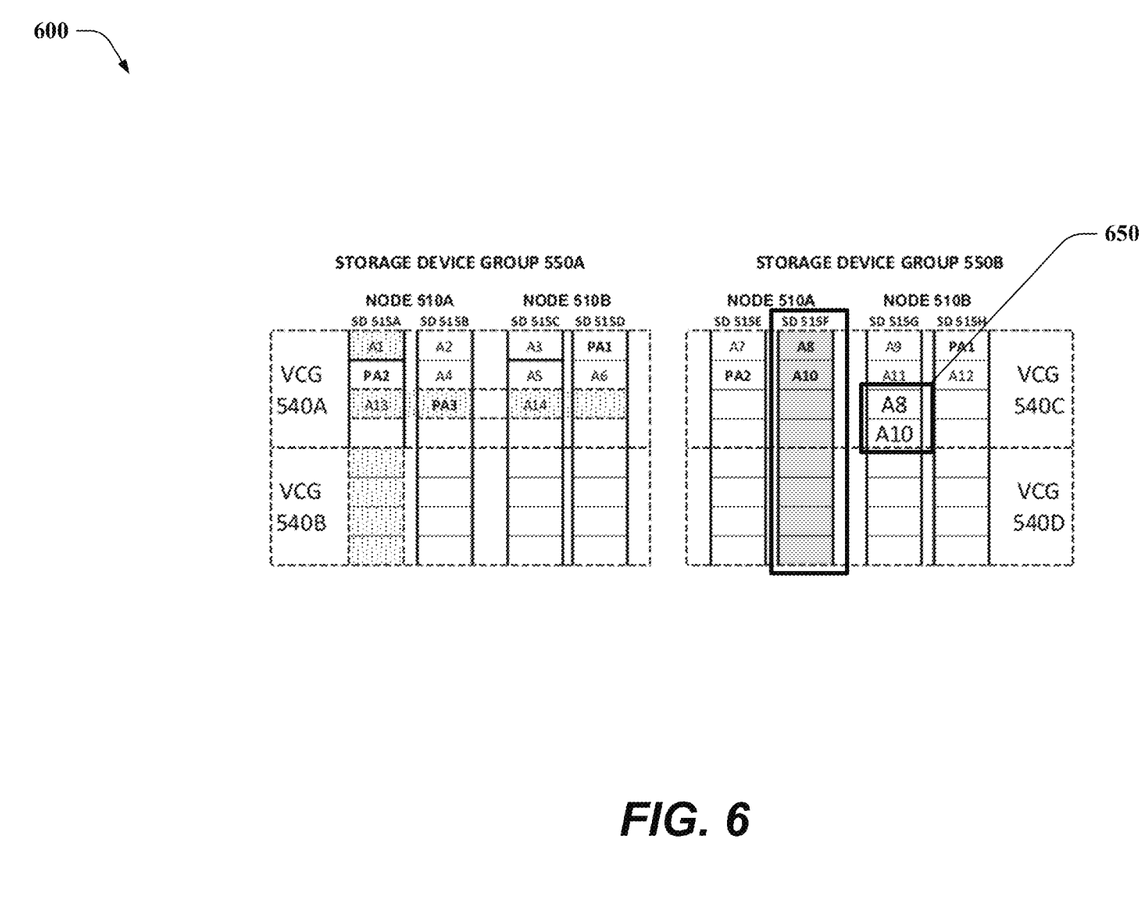
FIG. 6 illustrates a non-limiting example of the detailed view of the storage array of FIG. 5, with a movement physical file data, and a continuity of LDB addressing, in accordance with one or more embodiments.

FIG. 6 illustrates a non-limiting example of the detailed view of the storage array of FIG. 5, with a movement physical file data, and a continuity of LDB addressing, in accordance with one or more embodiments. For purposes of brevity, description of like elements and/or processes employed in other embodiments is omitted.

In the example depicted, SD 515F needs to be taken out of service, and LDBs A8 and A9 must be moved to another location in storage array 600. Alternatively, SD 515F can have failed, and LDBs A8 and A10 are recovered to another location of the array, e.g., A8 recovered by parity bits PA1 and A10 recovered by parity bits PA2.

As described above, A8 and A10 are LDBs of the second part of the example streaming file, storage device group 550B holds the remainder of this second part, e.g., A7, A9, A11, and A12, and storage device group 550B is used to retrieve this second part in parallel with the first part of the file, stored with storage device group 550B. Thus, in one or more embodiments, the data of LDBs A8 and A10 can be placed at any free physical location in an SD that is in storage device group 550B, e.g., SD 515E, 515G, and 515H. One factor that can influence the choice is the number of other LDBs currently handled by an available SD. For example, SD 515E and 515H, because of parity bit storage (e.g., PA1 and PA2) only retrieve a single LDB each for the second part of the file (e.g., A7 and A12), while SD 515G retrieves two LDBs. Thus, in some circumstances, while highlighted location 650 is a possible destination for the data of LDBs A8 and A10, SDs 515E or 515H could be a more advantageous choice.

With respect to logical addressing being maintained after physically moving A8 and A10. When a new location in a storage device group 550B is selected that is in the same VCG 540C as the old location, the same logical addresses of the LDBs can maintained by remapping the logical addresses to the new physical location, e.g., in backing store 117 discussed above. In other circumstances, remapping can also be accomplished to new VCGs 540D, as long as the VCGs are in the same storage device group 550B.

Figure 7:
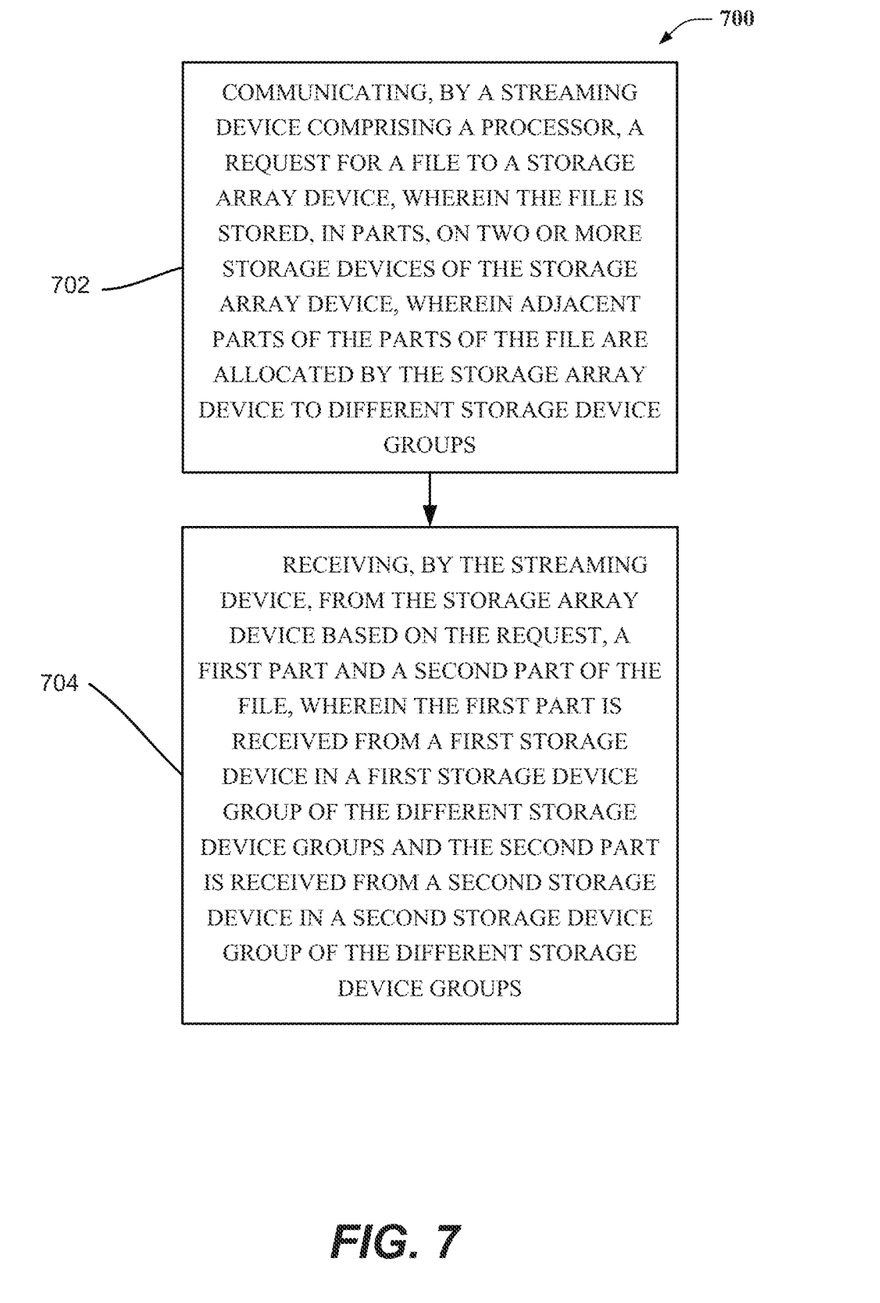
FIG. 7 illustrates an example flow diagram for a method 800 that can facilitate maintaining a consistent logical data size with variable protection stripe size in redundant array of independent disks system, in accordance with one or more embodiments.

FIG. 7 illustrates an example flow diagram for a method 700 that can facilitate maintaining a consistent logical data size with variable protection stripe size in redundant array of independent disks system, in accordance with one or more embodiments. For purposes of brevity, description of like elements and/or processes employed in other embodiments is omitted.

At element 702, method 700 can comprise communicating, by a streaming device (e.g., file streaming component 360) comprising a processor, a request for a file to a storage array 330 device, wherein the file is stored, in parts (e.g., 205A-D), on two or more storage devices of the storage array device, and wherein adjacent parts of the parts of the file are allocated by the storage array device to different storage device groups.

At element 704, the method 700 can further comprise receiving, by the streaming device (e.g., file streaming component 360), from the storage array 330 device based on the request, a first part 205A and a second part 205B of the file, wherein the first part is received from a first storage device in a first storage device group of the different storage device groups and the second part is received from a second storage device in a second storage device group, of the different storage device groups.

Figure 8:
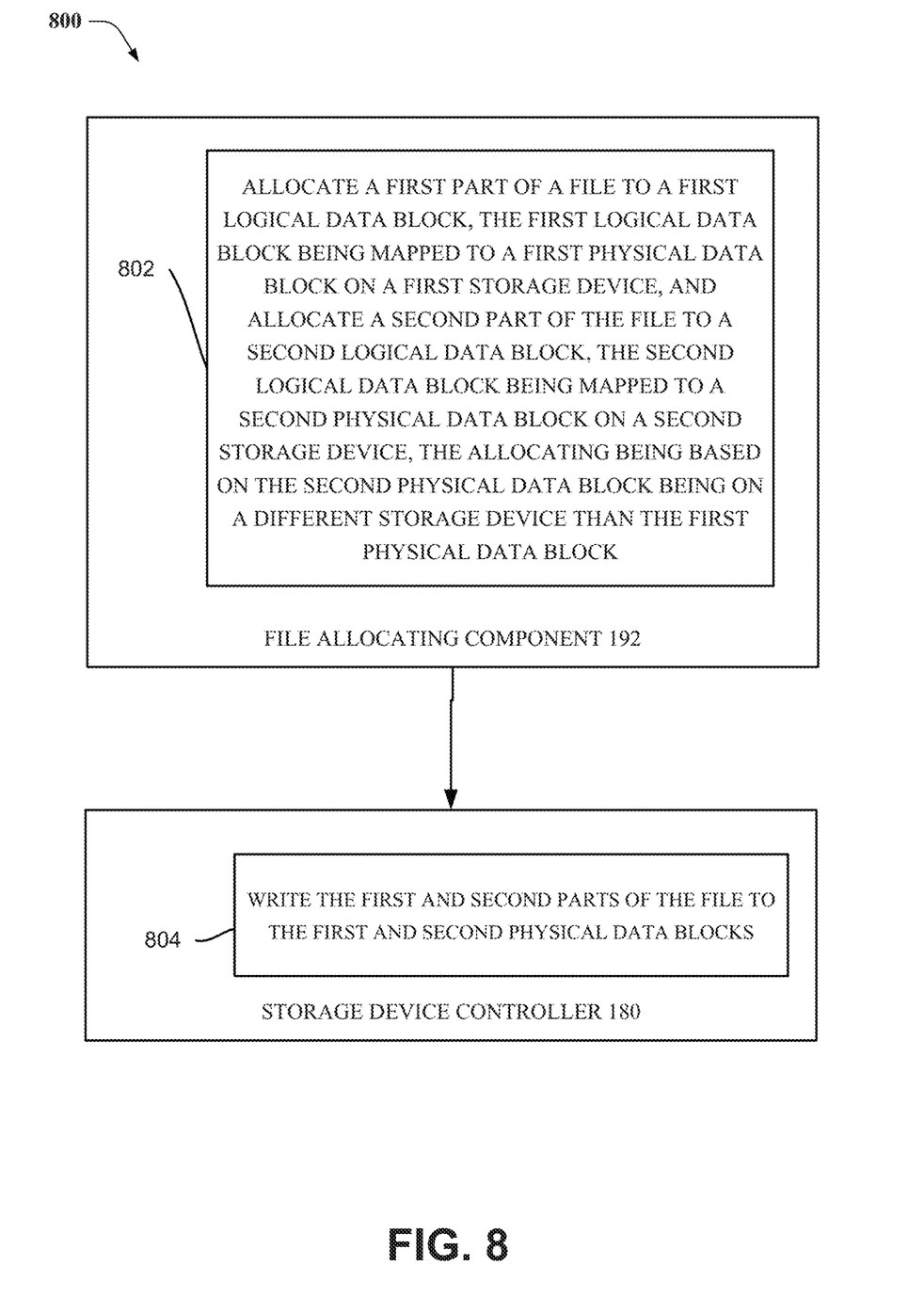
FIG. 8 is a flow diagram representing example operations for a method that can facilitate maintaining a consistent logical data size with variable protection stripe size in an array of independent disks system, in accordance with various aspects and implementations of the subject disclosure.

FIG. 8 is a flow diagram representing example operations of system comprising file allocating component 192, and storage device controller 180, in accordance with one or more embodiments. For purposes of brevity, description of like elements and/or processes employed in other embodiments is omitted.

File allocating component 192 can be configured 802 to allocate a first part 205A of a file to a first data block 575, the first logical data block being mapped to a first physical data block on a first storage device, e.g., SD 215A.

File allocating component 192 can be further configured allocate a second part 205B of the file to a second logical data block, the second logical data block 240B being mapped to a second physical data block on a second storage device 215D, the allocating being based on the second physical data block being on a different storage device 215D than the first physical data block. Storage device controller 180 can be configured 804 to write the first and second parts of the file to the first and second physical data blocks.

Figure 9:
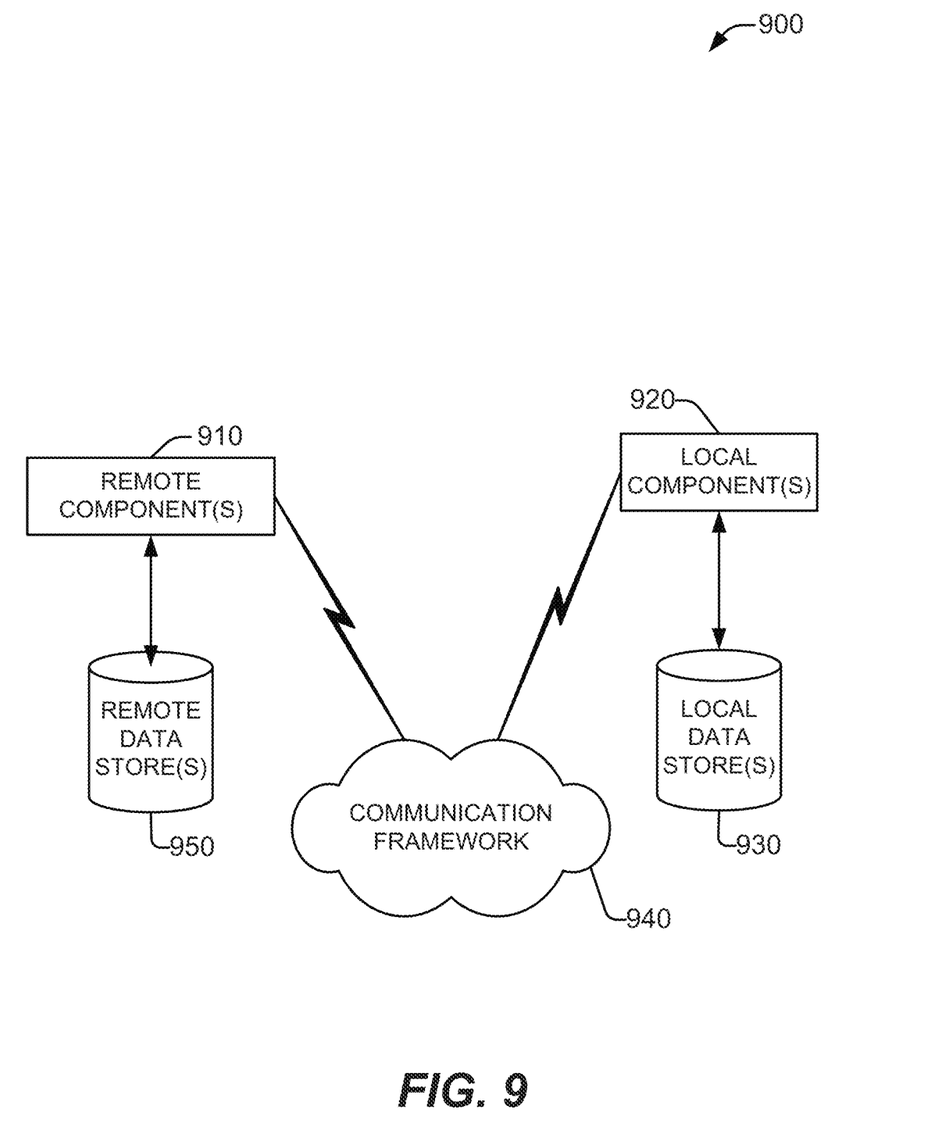
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a size changer (e.g., size changer 92) and a predictor (e.g., predictor 94) and/or programs that communicate/use the remote resources 99 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
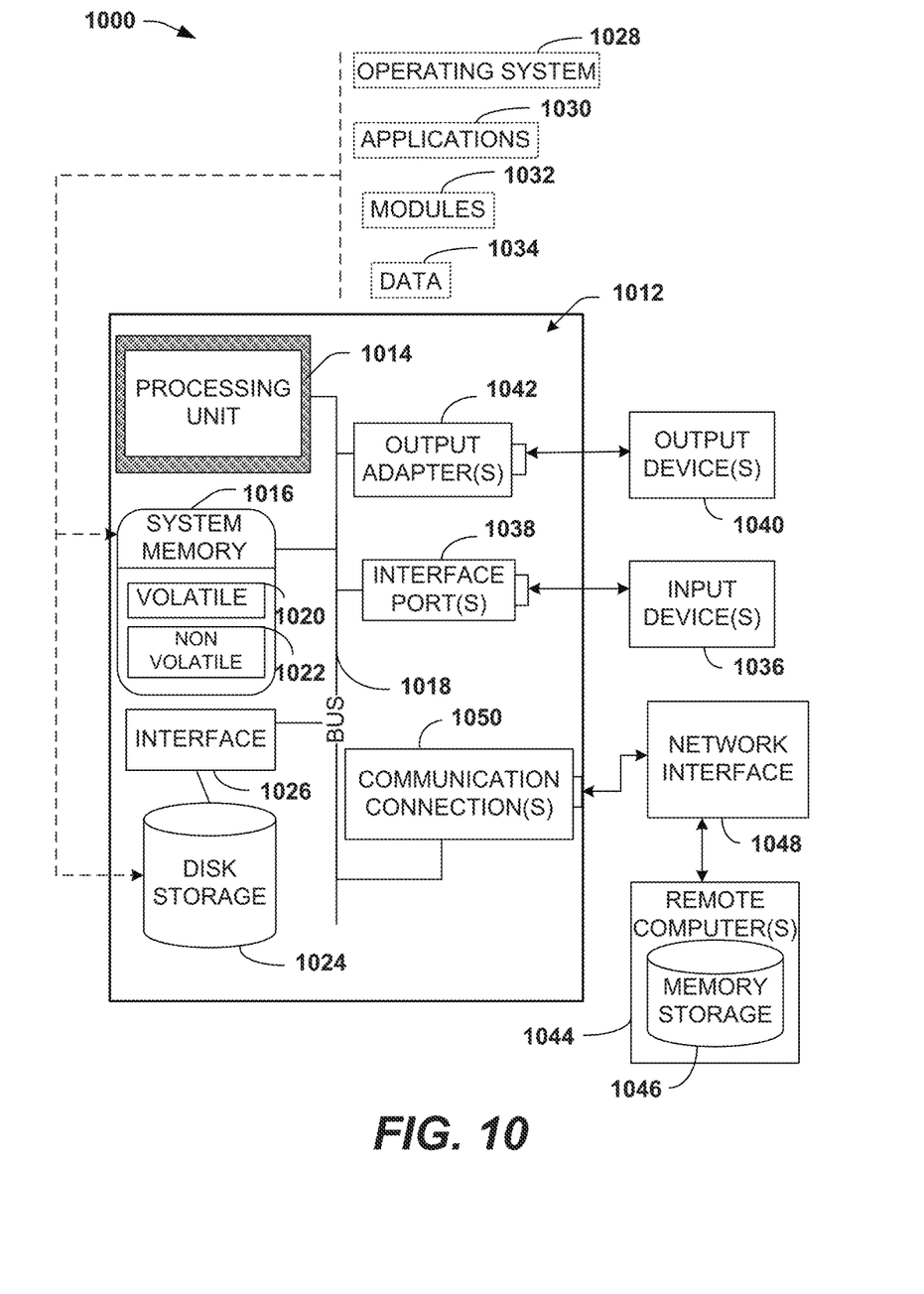
FIG. 10 illustrates an example block diagram of a computing system operable to execute the disclosed systems and methods in accordance with various aspects and implementations of the subject disclosure.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with one or more embodiments/implementations described herein. Computer 1012 can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
   a node in a redundant array of independent storage devices, the node comprising:
   a memory that stores computer executable components;
   a first storage device and a second storage device; and
   a processor that executes the computer executable components stored in the memory, wherein the computer executable components comprise:
   a file allocating component to:
      analyze content of a file to detect a high-speed retrieval requirement for retrieving the content of the file, and to determine that the file does not comprise a requirement for random access retrieval of the content of the file, resulting in an indication that the file comprises content to be streamed;
      based on the indication allocate a first part of the file to a first logical data block, the first logical data block being mapped to a first physical data block on the first storage device; and
      facilitate streaming of the file by allocating a second part of the file to a second logical data block, the second logical data block being mapped to a second physical data block on the second storage device, the allocating being based on the second physical data block being comprised in a different storage device than the first physical data block, wherein the second part of the file is consecutive and adjacent to the first part of the file, and wherein the file allocating component facilitates the streaming of the file based on consecutive and adjacent parts of the file being stored for parallel retrieval from different storage devices; and
   a storage device controller to, based on the allocating of the first and the second parts of the file, write the first part and the second part of the file to the first physical data block and second physical data block.

2. The system of claim 1, the node further comprising a file divider to analyze the file and divide the file into the first part and the second part to further facilitate the streaming of the file.

3. The system of claim 1, wherein the file divider divides the file into the first part and the second part based on a specified part size.

4. The system of claim 1, further comprising a file selector to select the file for allocation, by the file component, based on characteristics of the file.

5. The system of claim 1, wherein the storage device controller further arranges the first logical block and the second logical block according to a protection stripe spanning the first storage device and the second storage device.

6. The system of claim 1, further comprising a mapping component to remap the first logical data block to a third physical data block on a third storage device.

7. The system of claim 6, wherein after a remapping of the first logical data block to the third physical data block on the third storage device by the mapping component, the first logical data block retains a same logical address.

8. The system of claim 1, wherein the first physical data block is comprised in a first storage device and the second physical data block is comprised in a second storage device, and wherein the parts of the file are stored for parallel retrieval by a retrieval of the first part for streaming from the first storage device while the second part is retrieved in parallel and cached for streaming when streaming of the first part is completed.

9. The system of claim 1, wherein the different storage devices respectively comprise different storage device controllers that facilitate retrieving the first and second part of the file concurrently or substantially simultaneously.

10. A computer implemented method, comprising:
    communicating, by a streaming device comprising a processor, a request for a file to a storage array device, wherein, based on an indication that the file comprised content to be streamed, the file was stored, in parts, on at least two storage devices of the storage array device, wherein, based on the indication, to facilitate streaming of the file, consecutive, adjacent parts of the file were allocated by the storage array device to different storage device groups corresponding to different ones of the at least two storage devices, and wherein the indication was generated based on an analysis of content of the file to determine that the file comprised content to be streamed, wherein the indication is based on analysis of the file to detect a high-speed retrieval requirement applicable to retrieving the content of the file, to determine and that the file does not comprise a requirement applicable to random access retrieval of the content of the file; and
    based on the consecutive adjacent parts of the file being stored on the different storage device groups, receiving, by the streaming device, from the storage array device, based on the request, a first part and a second part of the file, wherein, based on the indication, the first part was retrieved from a first storage device in a first storage device group of the different storage device groups and the second part was retrieved in parallel from a second storage device in a second storage device group of the different storage device groups.

11. The computer-implemented method of claim 10, wherein the first part and the second part of the file are received by the streaming device based on the storage array device converting the request to send the file into a first logical address corresponding to a first physical address on the first storage device and a second logical address corresponding to a second physical address on the second storage device.

12. The computer-implemented method of claim 10, further comprising:
receiving, by the streaming device, from the storage array device, a third part and a fourth part of the file, wherein the third part of the file is received from a third storage device in the first storage device group and the fourth part of the file is received from a fourth storage device in the second storage device group.

13. The computer-implemented method of claim 12, wherein, at a storing of the file by the storage array device, the file is divided into the first part, the second part, the third part, and the fourth part of the file, and wherein the first part and the third part of the file are stored on devices having different storage device groups from the second part and the fourth part of the file.

14. The computer-implemented method of claim 13, wherein, based on the content of the file, the adjacent parts of the file are selected to be stored on devices having different storage device groups.

15. A non-transitory computer-readable storage medium comprising executable instructions that, when executed by a processor, facilitate performance of operations, the operations comprising:
based on an indication that a file comprises content to be streamed, allocating a first part of the file to a first logical data block, the first logical data block being mapped to a first physical data block on a first storage device, wherein the indication was generated based on an analysis of content of the file to determine that the file comprised content to be streamed, wherein the indication was based on analysis of the file to detect a high-speed retrieval requirement for retrieving the content of the file, and to determine that the file does not comprise a requirement for random access retrieval of the content of the file;
facilitating streaming of the file by allocating a second part of the file to a second logical data block, the second logical data block being mapped to a second physical data block on a second storage device, wherein the second part of the file is consecutive and adjacent to the first part of the file, wherein the allocating facilitates the streaming of the file based on consecutive and adjacent parts of the file being stored, based on the indication, for parallel retrieval from different storage devices; and
writing the first and second parts of the file to the first and second physical data blocks.

16. The non-transitory computer-readable storage medium of claim 15, wherein the operations further comprise:
analyzing the file; and
dividing the file into the first and second parts of the file.

17. The non-transitory machine-readable storage medium claim 16, wherein analyzing the file identifies a tag at a tag position to indicate that the file is to be divided at the tag, and wherein dividing the file into the first and second parts of the file comprises dividing the file into the first and second parts of the file at the tag position.

18. The non-transitory computer-readable storage medium of claim 15, wherein the operations further comprise selecting the file for allocation based on a characteristic of the file.

19. The non-transitory computer-readable storage medium of claim 18, wherein the characteristic of the file comprises that the file comprises content to be streamed.

20. The non-transitory computer-readable storage medium of claim 15, wherein the operations further comprise arranging that the first and second logical blocks are in a protection stripe spanning the first and second storage devices.

* * * * *